Patented Jan. 2, 1923.

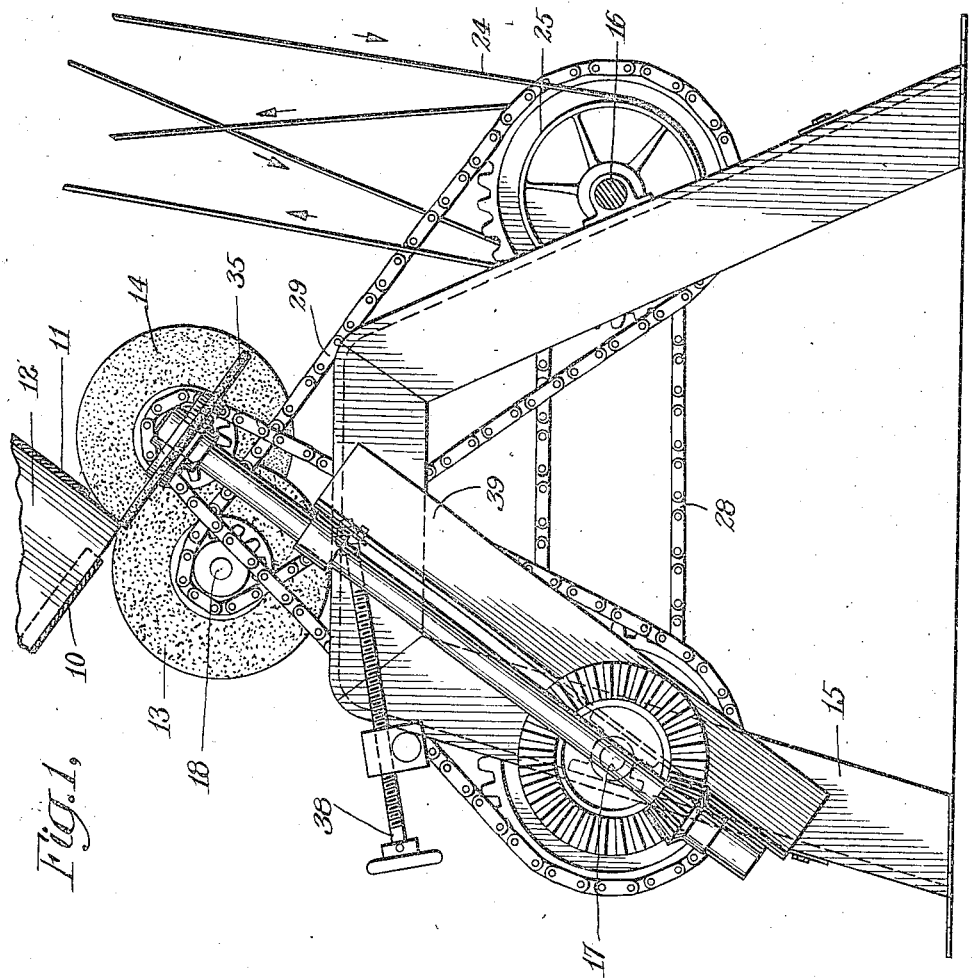

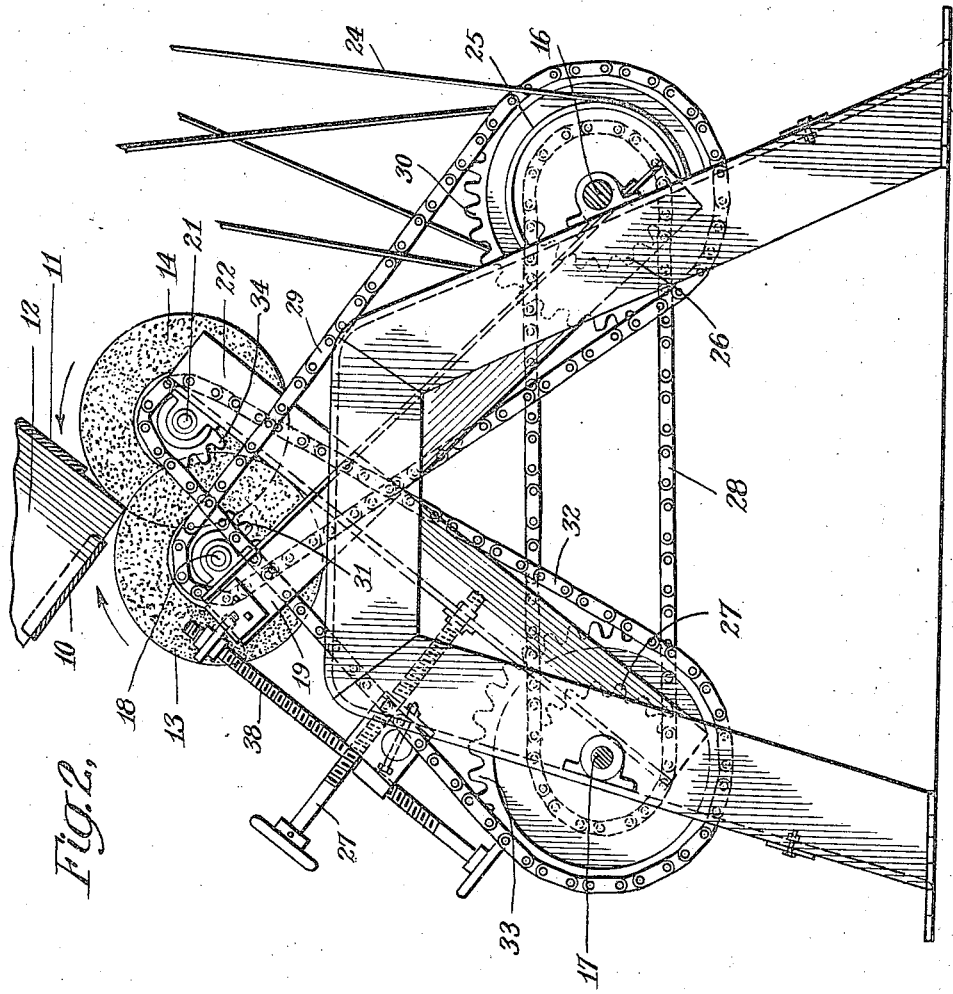

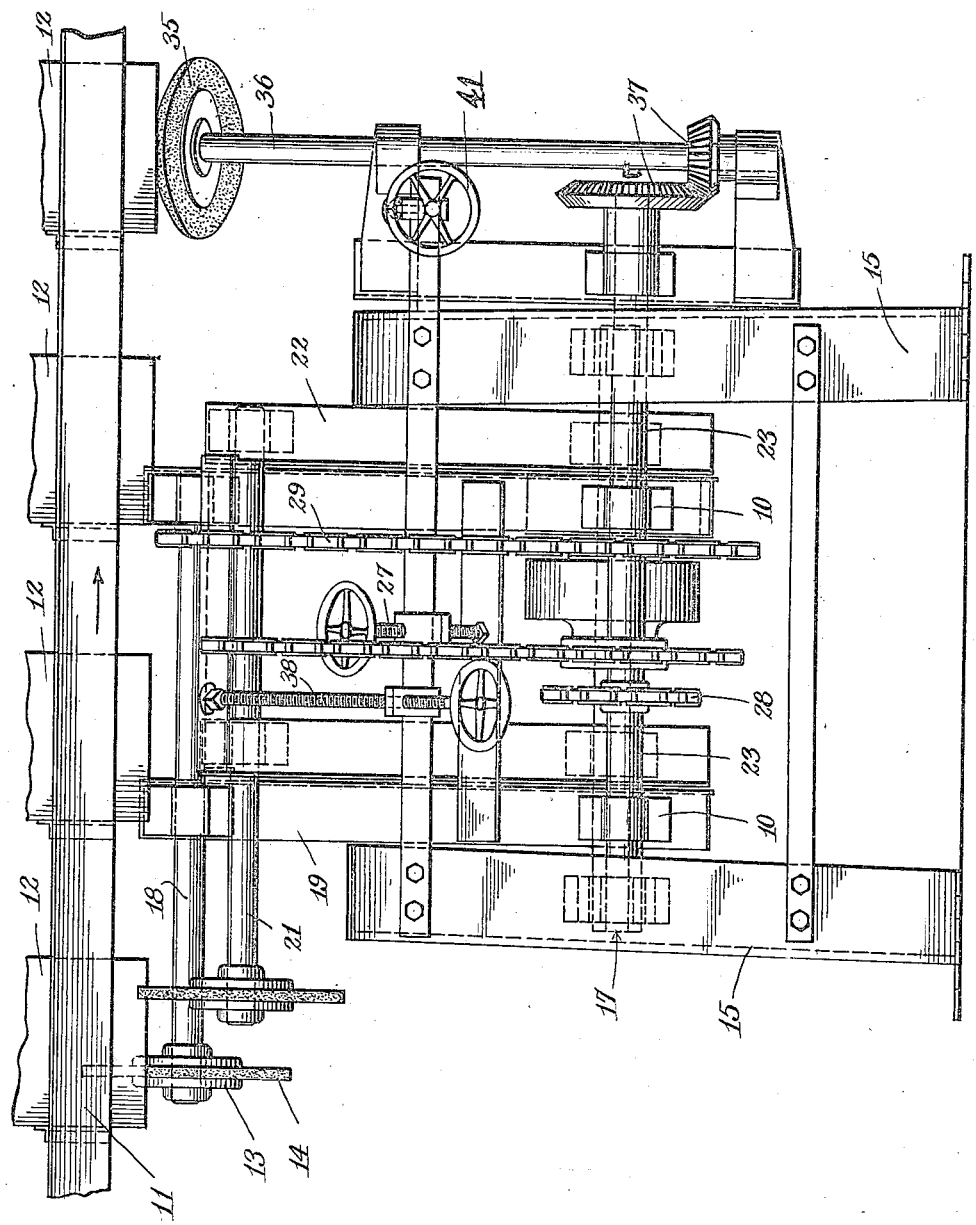

1,440,866

UNITED STATES PATENT OFFICE.

ROLLIN L. DRAKE, OF PORT ARTHUR, TEXAS, ASSIGNOR TO THE TEXAS COMPANY, OF NEW YORK, N. Y., A CORPORATION OF TEXAS.

SOLDER-WIPING MACHINE.

Application filed July 16, 1920. Serial No. 396,661.

*To all whom it may concern:*

Be it known that I, ROLLIN L. DRAKE, a citizen of the United States, residing at Port Arthur, county of Jefferson, and State of Texas, have invented certain new and useful Improvements in Solder-Wiping Machines, of which the following is a specification.

My invention relates to the manufacture of metal cans and containers and has special reference to the removal of the excess solder and the formation of a smooth surface along the soldered seams of the cans or containers during their formation.

The invention pertains to an apparatus or machine for manufacturing metal containers in which it is required to solder one or more seams of a series of containers as they are conducted by conveyers, the various seams to be soldered being successively passed through solder baths. After each application of solder has been made the cans are subjected to the action of a new and improved mechanism by which the excess solder is removed and an even surface is made over the soldered seam.

According to my invention I apply suitable brushes or wipers rotating in different planes across the soldered seam in order to insure that no ridges of solder remain on the cans and in order that every portion of the seams may be thoroughly brushed and a maximum amount of solder recovered.

One object of my invention is to provide a simple and improved mechanism which is so constructed and arranged that the required amount of pressure necessary to effectually remove the excess solder may be continually applied to the can without in any way interfering with the proper operation of the mechanism. This object may be accomplished as in the structure illustrated by providing a brush or wiper which is adjustable so as to insure that its point of contact against the can is always at the same relative distance from the driving shaft.

Other objects and advantages of my invention will appear from the following detailed description thereof.

In the drawings which illustrate the preferred form of the invention:

Figure 1 is an end elevation of an apparatus constructed in accordance with my invention and constituting an embodiment thereof.

Figure 2 is a view corresponding to Figure 1 with one of the buffing wheels and its driving mechanism broken away.

Figure 3 is a front elevation of the same machine.

Referring to the drawings:

10—11 designate a two part conveyer belt by which a plurality of cans 12 are conducted past the wiping or brushing mechanism after solder has been applied to their seams. The belt travels in the direction indicated by the arrow in Figure 3 and the cans are thus brought successively into position to be operated upon by a pair of buffing wheels or rotary brushes 13 and 14. The brushing mechanism comprises a suitable framework 15 upon which substantially parallel spaced driving shafts 16 and 17 are journaled, a frame 19 pivotally mounted in bearing boxes 10 upon the shaft 16, and a frame 22 pivotally mounted in bearing boxes 23 upon the shaft 17. The frames 19 and 22 are inclined to each other and cross near their upper ends where high speed driven shafts 18 and 21 are journaled, buffing wheels 13 and 14 being affixed to the respective driven shafts at close proximity to each other as clearly shown in the drawings.

In the arrangement illustrated for operating the buff shafts both shafts are driven from a common driving shaft. Thus a pulley 25 is keyed to the shaft 16 and power is supplied to the shaft by a belt 24 which runs on the pulley 25. Power is transmitted from the shaft 16 to the shaft 17 by a chain 28 running on sprocket wheels 26 and 27, respectively, keyed to shafts 16 and 17. It is desirable to have the buffs rotated in opposite directions and for this purpose a pulley 39 which may be driven by a crossed belt 40 is loosely mounted on the shaft 16. Integral with the pulley 39 is a sprocket wheel 30 which carries a chain 29 by which power is transmitted from the shaft 16 to the shaft 18 through the sprocket wheel 31 which is keyed to the shaft 18. A sprocket wheel 34 is keyed to the shaft 31 and a belt 32 carried by the sprockets 33 and 34 transmits power from the shaft 17 to the shaft 31.

The cans fit into the angle between the two parts of the conveyor belt, the edge seams being exposed (see Figure 1) in such manner as to be brushed by the buffing wheels 13 and 14. There is a tendency for a small amount of solder to escape these buffing wheels and remain on the can in the form of a thin ridge intermediate the zone of operation of the two buffing wheels, but this is abrogated by a third buffing wheel 35 which rotates in a plane at an angle to those of the buffing wheels 13 and 14. For instance, as shown, the buffing wheels 13 and 14 rotate in planes transverse to the direction of travel of the cans on the belt while the buffing wheel 35 is arranged to rotate in the plane of the conveyor belt. It is secured to the shaft 36, and is rotated from the shaft 17 through bevel gears 37.

The frame 19 supporting the shaft 18 is provided with an adjusting screw 38 by means of which the buffing wheel 13 may be pressed firmly against the cans and may be adjusted to take up for wear and for varying conditions of service. It is to be noted that the distance from the center of the shaft 18 to the center of the shaft 16 is always the same, regardless of variations in adjustment by means of the screw 38, i. e., the adjustment is a pivotal one about the shaft 16 as an axis. Thus it is possible to have the buffing wheel in proper position and at the same time maintain the chain drive between the shafts 16 and 18.

Attention is directed to the fact that the frame 19 is pivotally mounted in such position that the point of contact between the buffing wheel and the can falls in a circumferential line, having the axis of the shaft 16 as a center of curvature and extending through the axis or buffing wheel. This is for the purpose of insuring a satisfactory buffing job and also for automatically accommodating the gradual reduction in size of the buffing wheel due to wear. An adjusting screw 27 is provided for the purpose of controlling the buffing wheel 14 in the same manner that the screw 38 controls the wheel 13. In like manner a screw 41 is attached to adjust the frame 39 on which the buffing wheel 35 is supported.

As apparent from an inspection of the drawings, the arrangement of my present invention permits the buffing wheels 13, 14 and 35 to be located near the ends of their respective shafts so that they may be readily removed and replaced when necessary or desirable.

In the use of my invention the cans are conveyed by the conveyer 1 in such manner that the seam of the can, after the necessary solder has been applied thereto, may be cleaned and wiped. The invention is particularly adapted for use in connection with systems of metal ware manufacture in which the cans or containers are constructed with one or more seams requiring the use of solder. In this use of the invention a given seam of the can is passed through a solder bath or the solder is applied in any other suitable manner after which the soldered seam is subjected to the action of suitable buffs or brushes arranged as described herein. The cans are then conveyed by a suitable belt mechanism and are automatically turned over so as to subject the other seams in succession to the same action, that is, first, the application of solder and second the brushing or wiping action effected by the mechanism described herein.

The use of my invention effects a great saving in the use of solder as all excess solder is removed from the cans. A great efficiency in the use of the brushes or buffs is also made possible inasmuch as the buffs may be worn down practically to the core by reason of the adjusting mechanism.

What I claim is:

1. A solder wiping machine comprising a pair of pivotally mounted over-lapping frames, over-lapping buffs mounted thereon, means for rotating said buffs and means for conveying a can in a direction at substantially right angles to the plane of rotation of the buffs and in contact therewith.

2. A solder wiping machine comprising a pair of pivotally mounted over-lapping frames, a buff mounted on each frame and in over-lapping relation to each other, means for conveying across the buffs a can arranged at such an angle in respect to the buffs that an edge thereof may be brushed thereby, means for rotating the buffs in opposite directions and toward said edge of the can.

3. A solder wiping machine comprising a pair of pivotally mounted over-lapping frames, a buff mounted on each frame and in over-lapping relation to each other, means for conveying across the buffs a square can arranged at such position with respect to the buffs that an edge thereof may be brushed thereby, means for rotating the buffs in opposite directions and toward said edge of the can, a rotatable buff adapted to brush said edge and the plane of rotation of which is at substantially right angles to the planes of rotation of the over-lapping buffs and which is so positioned in respect to said over-lapping buffs that the can comes first in contact with said over-lapping buffs.

In witness whereof I have hereunto set my hand this sixth day of July, 1920.

ROLLIN L. DRAKE.